United States Patent [19]

Rohrbach et al.

[11] 4,353,306

[45] Oct. 12, 1982

[54] DRIVERLESS VEHICLE WITH TWO WAY ACCUMULATION

[75] Inventors: Peter H. Rohrbach, Bethlehem; Robert A. Hale, Easton, both of Pa.

[73] Assignee: Si Handling Systems, Inc., Easton, Pa.

[21] Appl. No.: 160,802

[22] Filed: Jun. 19, 1980

[51] Int. Cl.³ .............................................. B61B 13/12
[52] U.S. Cl. ..................................... 104/166; 104/247
[58] Field of Search ............................... 104/165–167, 104/169, 247, 249, 252, 302, 303

[56] References Cited

U.S. PATENT DOCUMENTS

| | | | |
|---|---|---|---|
| 3,356,040 | 12/1967 | Fonden | 104/166 X |
| 3,818,837 | 6/1974 | Jacoby et al. | 104/166 |
| 3,929,079 | 12/1975 | Eliassen | 104/247 X |
| 4,036,148 | 7/1977 | Jones et al. | 104/166 |
| 4,265,180 | 5/1981 | Uozumi | 104/247 |

*Primary Examiner*—Randolph A. Reese
*Attorney, Agent, or Firm*—Seidel, Gonda, Goldhammer & Panitch

[57] ABSTRACT

A driverless vehicle has at least one drive wheel for cooperation with a drive tube. The vehicle has two actuators coupled to the drive wheel for rotating the drive wheel to an accumulation position. Each actuator can be selectively rendered inoperative. The vehicle can be propelled by way of the drive wheel and drive tube in opposite directions along a track with either end of the vehicle being the front end.

11 Claims, 5 Drawing Figures

DRIVERLESS VEHICLE WITH TWO WAY ACCUMULATION

BACKGROUND

A driverless accumulation vehicle is per se old. A driverless vehicle having only one actuator for moving a drive wheel to an accumulation position is shown in U.S. Pat. No. 3,818,837. Vehicles having an actuator extending from a front end and another extending transversely from the vehicle for causing accumulation is taught in U.S. Pat. Nos. 3,356,040 and 4,036,148. Each of the vehicles in said patents has a distinct front end and a distinct rear end whereby the vehicle must be rotated 180° if it is to be propelled in an opposite direction along the same or adjacent tracks. In order to rotate the vehicle so that it may return in an opposite direction, there is usually provided a turn table at the end of the tracks. If two sets of tracks are provided at different elevations above one another, it is also necessary to provide an elevator for elevating or descending the vehicles at the ends of the tracks. The entire system is unnecessarily complicated if both turn tables and elevators are to be provided.

The present invention is directed to a driverless vehicle with two way accumulation which solves the problem of the prior art so that either end of the vehicle is the front end and wherein a turn table is no longer required.

SUMMARY OF THE INVENTION

The present invention is directed to a driverless vehicle having at least one drive wheel for cooperation with a drive tube. The drive wheel is movable from a drive position to an accumulation position. First and second actuators are provided on the vehicle for moving the drive wheel to an accumulation position. Each actuator is adjacent one of the opposite ends of the vehicle. A means is provided on the vehicle for selectively rendering each actuator inoperable whereby the vehicle can be propelled in opposite directions with one of the actuators being operable to cause accumulation upon contact with an obstacle.

It is an object of the present invention to provide a novel driverless vehicle having two way accumulation whereby either end of the vehicle is the front end.

It is another object of the present invention to provide a driverless vehicle having means for selectively rendering a front end of a vehicle to be the rear end and vice versa for selected accumulation in opposite directions.

It is an object of the present invention to provide a driverless vehicle which can be driven in opposite directions along a single track while being capable of accumulation in either direction upon contact with an obstacle or other vehicle.

Other objects will appear hereinafter.

For the purpose of illustrating the invention, there is shown in the drawing a form which is presently preferred; it being understood, however, that this invention is not limited to the precise arrangements and instrumentalities.

FIG. 3 is an end view of the vehicle shown in FIG. 1 as seen along the line 3—3.

Detailed Description

Figure 1:
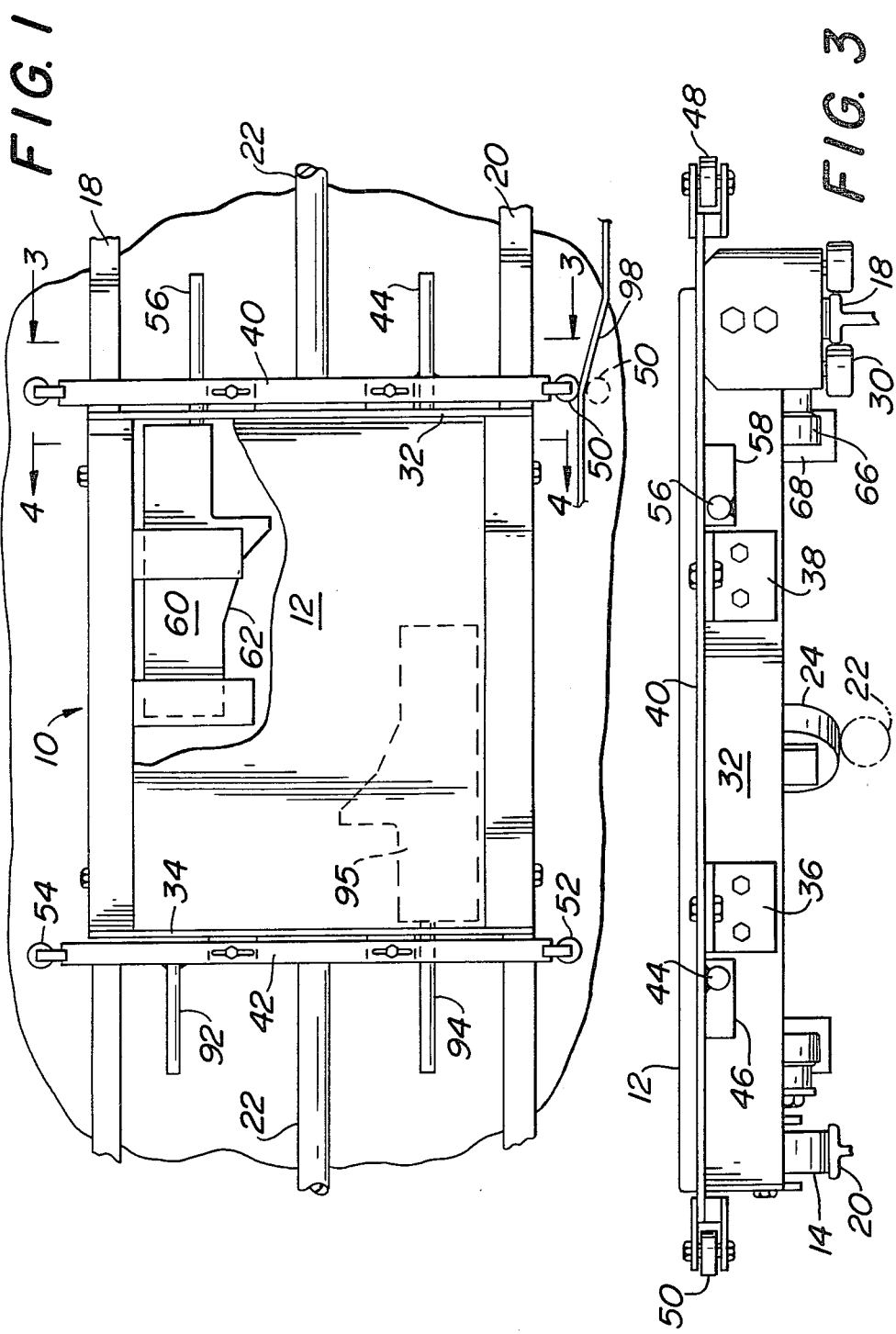
FIG. 1 is a top plan view of a vehicle in accordance with the present invention.
Figure 2:
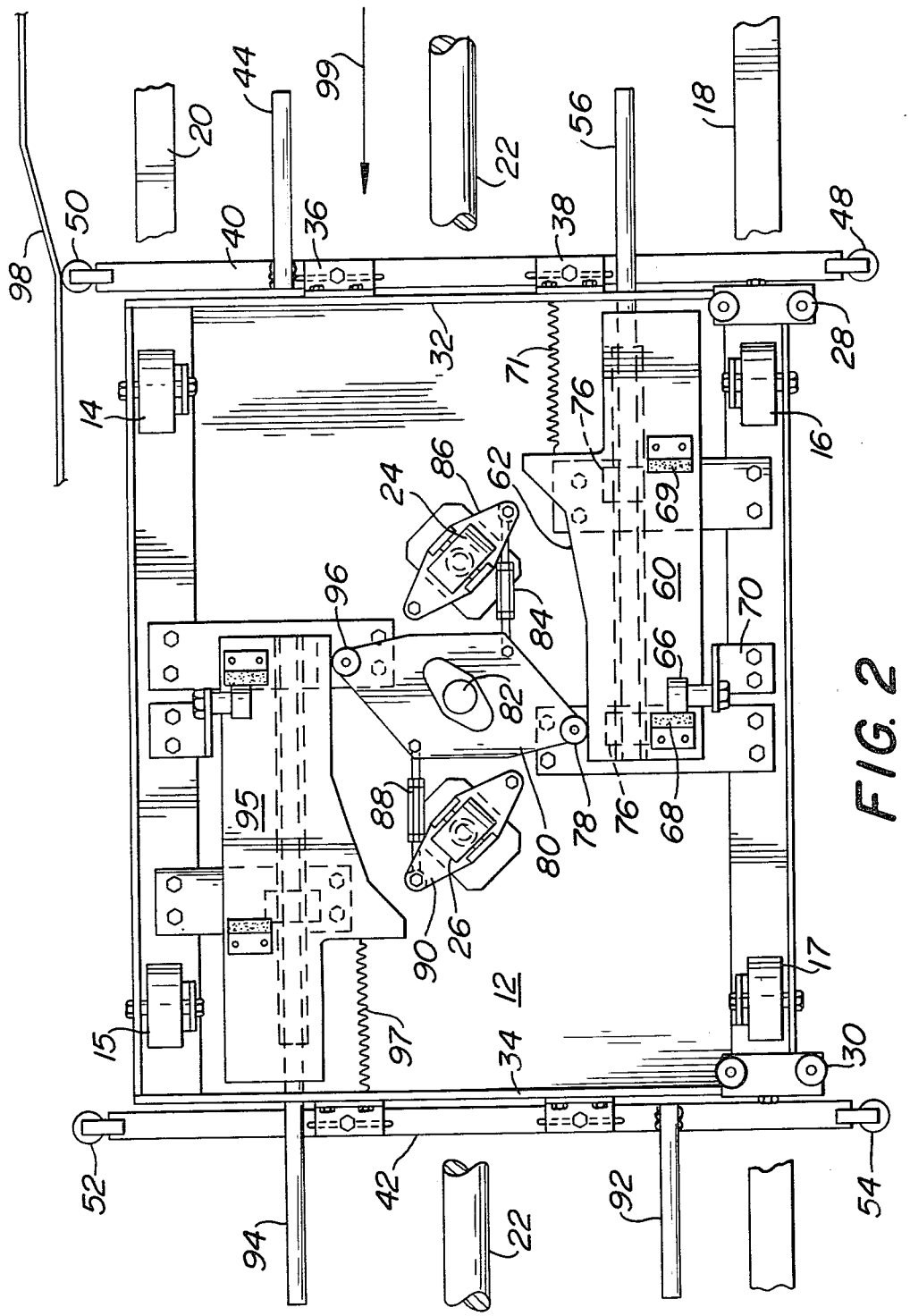
FIG. 2 is a bottom plan view of the vehicle shown in FIG. 1 but on an enlarged scale.

Referring to the drawing in detail, wherein like numerals indicate like elements, there is shown in FIG. 1 a driverless vehicle in accordance with the present invention designated generally as 10. The vehicle 10 includes a frame having a support deck 12 on which fixtures, loads, or the like may be mounted and supported. The deck 12 is provided with a peripheral frame on which are mounted support wheels 14 and 15 on one side for riding on a track 20 and support wheels 16 and 17 on the opposite side for riding on track 18. The bottom surface of the deck 12 has mounted thereon a pair of drive wheels 24 and 26 spring biased to a drive position as shown in FIG. 2. The drive wheels 24 and 26 are in rolling contact with a drive shaft or tube 22. The vehicle is preferably provided with a pair of guide rolls 28 and a pair of guide rolls 30 for rolling contact with a side edge of one of the tracks 18 and 20. The thusly described vehicle may assume a wide variety of configurations known to those skilled in the art.

The vehicle 10 includes an end plate 32 at one end and an end plate 34 at the opposite end. Brackets 36, 38 are fixedly secured to the plate 32. See FIGS. 2 and 3. On their upper surface, the brackets 36, 38 support a horizontally disposed slide 40. Slide 40 may be bar stock with a pair of guide slots extending therethrough. A bolt or other fastener extends through each guide slot on the slide 40 and is connected to one of the brackets 36, 38. Thus, the slide 40 is reciprocable in a direction transverse across the width of the vehicle in a direction perpendicular to tracks 18, 20. The extent of such reciprocation is limited by the length of the slots in the slide 40. A slide 42 is similarly supported by brackets on the plate 34. Element 40 need not reciprocate horizontally but instead could be supported to rotate or pivot between its various positions.

A projection 44 has one end fixedly secured to the slide 40 and projects longitudinally from one end of the vehicle 10 for any suitable distance such as 8 centimeters. Since the projection 44 is fixedly secured to the slide 40, they reciprocate as a unit.

Referring to FIG. 3, it will be noted that the end plate 32 is provided with an opening 46 which may be a slot or notch. The opening 46 accommodates the reciprocation of the projection 44. A cam follower 48 is rotatably supported by one end of the slide 40. A similar cam follower 50 is rotatably supported by the opposite end of the slide 40. The slide 42 is similarly provided with cam followers 52, 54 with the followers 50, 52 being on the same side of the vehicle 10.

Referring to FIGS. 1-3, a projection 56 extends through an opening 58 in the end plate 32. Opening 58 may be a slot or notch. Like opening 46, the opening 58 is elongated in a horizontal direction. Projection 56 is parallel to and extends for the same distance as the projection 44. The distance between the longitudinal axes of the projections 44, 56 is variable. In FIGS. 1 and 2, the distance between the projections 44, 56 is at a minimum.

Figure 4:
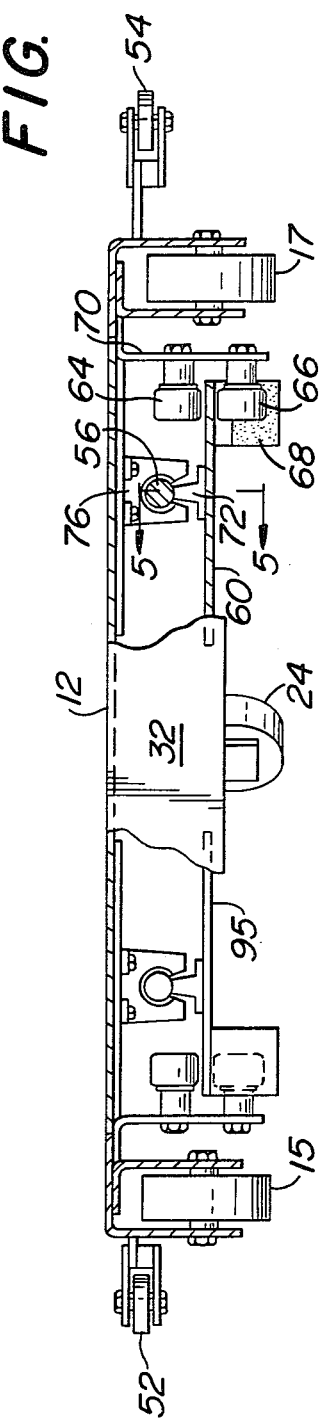
FIG. 4 is a sectional view taken along the line 4—4 in FIG. 1.

The projection 56 at the end beneath the vehicle 10 is connected to a horizontally disposed cam 60 having a cam surface 62 along one side edge thereof. The cam 60 is guided by guide rollers 64, 66 in rolling contact with opposite faces of cam 60. See FIGS. 2 and 4. The stub shafts for the rollers 64, 66 are supported from the bottom of the deck 12 by way of bracket 70. A bumper-limit stop 68 is adjustably coupled to the cam 60 for contact with the rollers 64, 66 thereby limiting the extent to which projection 56 extends beyond the end plate 32. A second bumper-limit stop 69 is adjustably connected to the cam 60 for similar contact with the roller 66 when projection 56 has been moved to one extreme position in a direction from right to left in FIG. 2. Cam 60 is spring biased at the position shown in FIG. 2 by spring 71.

Figure 5:
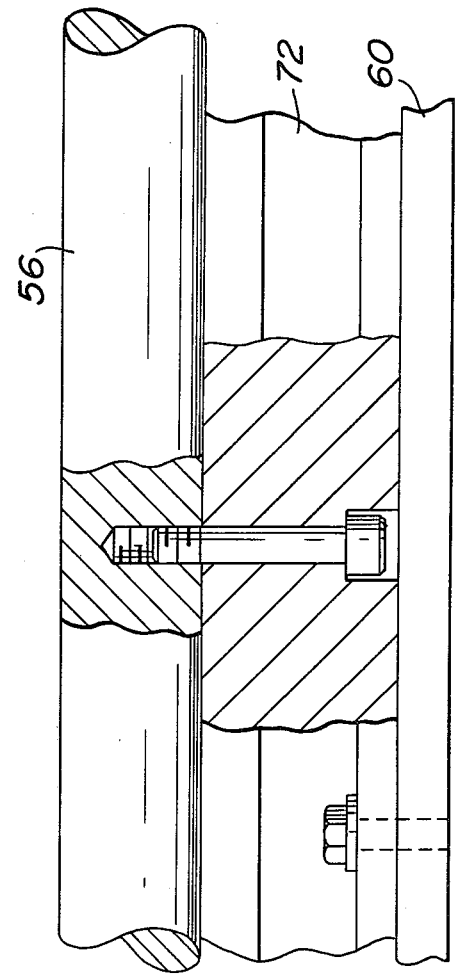
FIG. 5 is a sectional view taken along the line 5—5 in FIG. 4 but on an enlarged scale.

In addition to guidance for the projection 56 as provided by the guide rollers 64, 66, additional guide means is provided as follows. A shaft support 72 has flanges at its lower end bolted to the cam 60. The upper end of the shaft support 72 is removably bolted to the projection 56 as shown more clearly in FIG. 5. Journals 76 which are slotted on their lower end are bolted to the deck 12 and guide the projection 56. See FIGS. 2 and 4.

Referring to FIG. 2, a cam follower 78 is provided on a plate 80. Plate 80 is horizontally disposed and oscillatable about the vertical axis of pin 82. Pin 82 is suspended at its upper end by the deck 12. Cam follower 78 is in rolling contact with the cam surface 62 on cam 60. Plate 80 is coupled by way of a tie rod 84 to the support 86 for the drive wheel 24. Plate 80 is also coupled by way of tie rod 88 to the support 90 for the drive wheel 26. When plate 80 is oscillated in a clockwise direction in FIG. 2 due to contact between cam surface 62 and cam follower 78, each of the drive wheels 24, 26 will be rotated from the drive position shown in FIG. 2 to an accumulation position. In the accumulation position, the drive wheels 24 and 26 rotate about an axis which is between 0° and 5° offset with respect to the longitudinal axis of the drive shaft 22. The supports 86, 90 and their associated drive wheels are biased to the drive position as shown in a conventional manner. While two drive wheels 24, 26 are shown, only a single drive wheel could be used if desired. Plural drive wheels increases the thrust on the vehicle 10 so that it may propel greater loads and also provides for a smoother transition over joints in the drive shaft 22.

A projection 94 extends through an opening in the end plate 34 at the opposite end of the vehicle, and on the opposite side of the center line of the vehicle, from the projection 56. Projection 94 is connected to a cam 95 having a cam surface in rolling contact with a cam follower 96 on the plate 80. Hence, the drive wheels 24, 26 will be moved from a drive position to an accumulation or stop position whenever projection 56 or 94 is moved inwardly. Projection 94 and its associated cam 95 are guided and supported in the same manner as described above in connection with projection 56 in its cam 60. Projection 94 is spring biased to the position shown in FIG. 2 by spring 97. A cam 98 is provided at any location along the length of tracks 18, 20 where it is desired to reverse the direction in which accumulation will occur. In FIGS. 1 and 2, it will be noted that projections 44 and 94 are coaxial or aligned with one another whereas projections 56 and 92 are offset from one another.

Operation of accumulation of vehicle 10 is as follows. Let it be assumed that the cam followers 50, 52 have traversed the cam 98 as shown in FIG. 2. Projections 44 and 94 are now aligned. In this orientation, the vehicle 10 will accumulate when moving in the direction of arrow 99.

With the vehicle moving in the direction of arrow 99, and upon contact with an obstacle such as another vehicle on the tracks 18, 20, projection 94 will contact a solid portion of the end plate on the next adjacent vehicle or on any other obstacle. Projection 92 will not contact any solid portion of the end plate on the vehicle but rather will pass through an opening on such vehicle and corresponding to opening 58. Projection 94 and cam 95 move from left to right in FIG. 2 due to such contact whereby cam follower 96 causes the plate 80 to oscillate clockwise in FIG. 2 thereby causing accumulation and/or stopping of the vehicle 10. With the plate 80 pivoted to an accumulation or stop position, the bias on the drive wheels 24, 26 will be transmitted from the cam follower 96 to the cam 95 in a direction which is generally perpendicular to the longitudinal axis of the projection 94. Hence, there will be little or no driving force on vehicle 10 in a forward direction to supplement any comparable force on other vehicles which have been similarly accumulated along the tracks 18-20.

With the components arranged as shown in FIGS. 1 and 2, if the drive shaft 22 were to stop and then start rotating in an opposite direction, the following would occur when vehicle 10 contacts the next adjacent vehicle on the same tracks. Projection 44 on the vehicle 10 would contact projection 94 on the next vehicle. If the next vehicle has already accumulated, such contact would have no effect.

The vehicle 10 may be transferred from one set of tracks 18-20 to another set of tracks which are parallel or at a different elevation by a transfer vehicle or elevator respectively. Before being transferred onto an elevator or transfer vehicle, and in order that the vehicle 10 may accumulate in an opposite direction, the cam followers 48, 54 will be cammed inwardly due to contact with a cam comparable to cam 98 but on the other side of the tracks. Such camming action will shift slide 40 and its projection 44 relative to the projection 56. Likewise, projection 94 will be shifted along with its slide 42 until projections 56 and 92 are aligned. Such movement of slide 40 will then position projection 44 so that it no longer aligns with projection 94. Upon being driven by a drive shaft 22 rotating in an opposite direction, the vehicle then will now accumulate while traveling in a direction opposite to the direction of arrow 99.

Thus, the vehicle 10 may accumulate while traveling in opposite directions along the same or parallel tracks with either end of the vehicle being the front end. The direction in which accumulation occurs is selectively attained by shifting the slides 40, 42. Shifting of the slides 40, 42 need not be accomplished by way of cams as illustrated and described herein but may be accomplished by other means including manual shifting. While the slides 40, 42 are shifted in the same direction, each time they are shifted one of the slides is rendered inoperative for the purposes of causing accumulation while the other is rendered operative. In a typical operative embodiment, the amount of shifting of the slides is approximately 5 centimeters. When projection 44 is aligned with projection 94, projections 56 and 92 are misaligned and vice versa.

In the above description the projections such as projection 44 project for a distance of 8 centimeters. The extent of projection is variable depending on the weight and speed of the vehicle. As weight and speed decrease, the extent of projection can also decrease. If it is desired to maintain accumulated vehicles 8 centimeters apart, one 8 centimeter projection at one end or two 4 centimeter projections (one at each end) may be used. The important feature is the ability to selectively block or actuate the cam for pivoting the drive wheel.

The present invention may be embodied in other specific forms without departing from the spirit or essential attributes thereof and, accordingly, reference should be made to the appended claims, rather than to the foregoing specification, as indicating the scope of the invention.

We claim:

1. A driverless vehicle capable of being driven in opposite directions comprising:
   (a) a frame having front and rear ends and at least one drive wheel movable from a drive position to an accumulation position;
   (b) first and second accumulators for moving said drive wheel to said accumulation position, each actuator being adjacent one of the front and rear ends of the frame; and
   (c) means for enabling said vehicle to be propelled in opposite directions with only one of the actuators being operable at any given time and so that said actuators are alternately movable between an operative and inoperative position depending upon the direction of movement of the vehicle wherein one of the actuators is operable to cause accumulation upon contact with an obstacle.

2. A vehicle in accordance with claim 1 wherein each actuator includes a projection supported upon a shifting member, said shifting member being movable in a direction transverse to the direction of movement of the vehicle, thereby allowing each of said actuators to be moved between said operative and inoperative positions.

3. A vehicle in accordance with claim 2 including means responsive to the movement of said shifting member for automatically and selectively rendering each actuator inoperable.

4. A vehicle in accordance with claim 1 wherein said first actuator includes a projection located to one side of the longitudinal line bisecting the vehicle, said projection extending from one end of the vehicle and connected to a cam, said projection and cam being supported for reciprocatory movement, said second actuator including a second projection and cam at the opposite end of the vehicle and on the opposite side of the center line on the vehicle, each cam being coupled to the drive wheel by way of an oscillatible plate having a pair of cam followers, each cam follower being in contact with one of said cams.

5. A vehicle in accordance with claim 1 having more than one drive wheel simultaneously movable by each of said actuators from a drive position to an accumulation position.

6. A driverless vehicle comprising:
   (a) a frame having wheels for rolling along a track;
   (b) a drive wheel associated with said frame, said drive wheel being movable from a drive position to an accumulation position;
   (c) first and second actuators for moving said drive wheel to an accumulation position, each actuator being adjacent one of the front and rear ends of the frame, said actuators being on opposite sides of a longitudinal center line of the frame;
   (d) a projection connected to each actuator, said projection extending beyond an adjacent edge of the frame;
   (e) a discrete parallel rigid projection associated with the projection of each actuator;
   (f) means for moving each rigid projection with respect to its associated actuator projection to increase or decrease the distance therebetween; and
   (g) an oscillatible plate, said plate being coupled to said drive wheel; whereby each actuator projection is connected to a cam adapted to oscillate said plate by contact with a cam follower on the plate.

7. A vehicle in accordance with claim 6 wherein each rigid projection is integral with a slide, each slide being at one end of said vehicle, and a discrete cam follower at each end of each slide for contact with a stationary cam for increasing or decreasing said distance between the projections at each end of the vehicle.

8. A driverless vehicle comprising a frame having at least one drive wheel movable from a drive position to an accumulation position, an actuator at one end of the frame for moving said drive wheel to an accumulation position when the vehicle is moving in a first direction, said actuator including two projections, one projection being rigid in said direction while the other projection being movable upon contact with an obstacle to move said drive wheel to its accumulation position, and means supporting said projections so that the rigid projection may be selectively moved relative to the movable projection to permit or prevent accumulation.

9. A vehicle in accordance with claim 8 wherein said projections are parallel to each other and extend along said first direction.

10. A vehicle in accordance with claim 8 wherein each end of said frame contains an opening through which a projection on another vehicle can extend.

11. A vehicle in accordance with claim 8 including a second actuator at the opposite end of the vehicle for moving said drive wheel to an accumulation position when the vehicle is moving in an opposite direction.

* * * * *

UNITED STATES PATENT OFFICE
CERTIFICATE OF CORRECTION

PATENT NO. : 4,353,306
DATED : October 12, 1982
INVENTOR(S) : Peter H. Rohrbach et al It is certified that error appears in the above-identified patent and that said Letters Patent are hereby corrected as shown below:

Column 5, line 18, change "accumulators" to

-actuators-.

Signed and Sealed this

Thirteenth Day of March 1984

[SEAL]

Attest:

GERALD J. MOSSINGHOFF

Attesting Officer     Commissioner of Patents and Trademarks